US005362286A

United States Patent [19]

Satoh et al.

[11] Patent Number: 5,362,286

[45] Date of Patent: Nov. 8, 1994

[54] AUTOMATIC TRANSMISSION WITH UPSHIFT PROHIBIT DEPENDENT ON THROTTLE AND VEHICLE SPEED

[75] Inventors: Yuji Satoh; Hiromi Kono; Hiroyuki Soda; Masuhiro Otsuka, all of Saitama, Japan

[73] Assignee: Zexel Corporation, Tokyo, Japan

[21] Appl. No.: 51,811

[22] Filed: Apr. 23, 1993

Related U.S. Application Data

[63] Continuation of Ser. No. 730,992, Jul. 16, 1991, abandoned.

[30] Foreign Application Priority Data

Jul. 16, 1990 [JP] Japan ................................ 2-187417

[51] Int. Cl.[5] ................................ F16H 5/90

[52] U.S. Cl. ................................ 477/115; 477/138

[58] Field of Search ............... 74/866, 878; 364/624.1; 477/115, 123, 138

[56] References Cited

U.S. PATENT DOCUMENTS 4,643,048 2/1987 Hattori et al. ........................ 74/866
4,838,125 6/1989 Hamano et al. ................ 477/138 X
4,846,022 7/1989 Ito et al. ................................ 74/866
4,955,257 9/1990 Terayama et al. .................... 74/866
4,977,992 12/1990 Ohtsuka et al. .................. 74/866 X
5,044,230 9/1991 Shinya et al. .......................... 74/866
5,191,814 3/1993 Ando et al. ............................ 74/866
5,224,398 7/1993 Sasaki ................................ 74/866 X
5,265,499 11/1993 Soka et al. ........................ 74/866 X

FOREIGN PATENT DOCUMENTS 59-1855 1/1984 Japan .
63-72955 4/1988 Japan .

*Primary Examiner*—Dirk Wright
*Assistant Examiner*—Khoi Q. Ta
*Attorney, Agent, or Firm*—Kanesaka & Takeuchi

[57] ABSTRACT

An automatic transmission which includes a clutch (6); a clutch actuator (7) for detecting and controlling a position of the clutch; a transmission (1); a transmission actuator (2) for driving the transmission; a vehicle speed detector (22) for detecting a vehicle speed; a throttle opening detector (11) for detecting a throttle opening; an automatic shift unit (30) including a gear shift map (30*a*, 30*b*) having a gear shift characteristic which is determined based on the vehicle speed and the throttle opening; a computer unit (30*c*) for computing an instant gear position of the transmission based on the vehicle speed and the throttle opening according to the gear shift map; a gear position selector (30*d*) for controlling the transmission actuator based on the instant gear position to upshift or downshift the transmission; a shift prohibit unit (40) for determining whether the instant gear position matches the previous gear position from a memory (40*a*) for a predetermined times in a predetermined period and, if they do not match for the predetermined times, invalidating the instant gear position and prohibiting any shift operation according to the gear shift map; and a shift determination unit (41) for establishing an upshift prohibit condition when the throttle opening is equal to or less than a predetermined value while releasing the upshift prohibit condition when the vehicle speed is low or the clutch is in a position toward disengagement from a half clutch position, or with a low-speed gears even if the throttle opening is equal to or less than the predetermined value.

7 Claims, 5 Drawing Sheets

START
S1 TAKE IN GEAR POSITION COMPUTED BY COMPUTER UNIT
S2 READ PREVIOUS GEAR POSITION OUT OF MEMORY
S3 INSTANT GEAR POSITION SAME AS PREVIOUS GEAR POSITION ? — YES / NO
S4 INCREMENT COUNTER BY ONE
S5 COUNT EQUAL TO OR GREATER THAN 4 ? — YES / NO
S6 MAKE GEAR POSITION VALID
S7 CLEAR COUNTER
S8 STORE INSTANT GEAR POSITION IN MEMORY
END

START
L1 THROTTLE OPENING BELOW PREDETERMINED VALUE ? — YES / NO
L2 VEHICLE SPEED EQUAL TO OR LESS THAN 5 km/h ? — YES / NO
L3 CLUTCH DISENGAGED MORE THAN HALF CLUTCH? — YES / NO
L4 TRANSMISSION IN LOW-SPEED GEAR ? — YES / NO
L5 ESTABLISH UPSHIFT PROHIBIT CONDITION
L6 SET TIMER
L7 TIMER EQUAL TO 0 ? — YES / NO
L8 RELEASE UPSHIFT PROHIBIT CONDITION
L9 SUBTRACT TIMER
END

1
TRANS-
MISSION
2
2a
2b
2c
2d
2e
2f
2g
D/U
M
4
30
30a
30b
30c
30d
COMPUTER
UNIT
GEAR
POSITION
SELECTOR
AUTMATIC
SHIFT
UNIT
INPUT
SIGNAL
40
40a
40b
41
SHIFT
PROHIBIT
UNIT
MEMORY
COUNTER
SHIFT
DETERMINATION
UNIT

START
S1
TAKE IN GEAR POSITION COMPUTED BY COMPUTER UNIT
READ PREVIOUS GEAR POSITION OUT OF MEMORY
S2
S3
INSTANT GEAR POSITION SAME AS PREVIOUS GEAR POSITION ?
NO
YES
S4
INCREMENT COUNTER BY ONE
S7
CLEAR COUNTER
S5
COUNT EQUAL TO OR GREATER THAN 4 ?
NO
S8
STORE INSTANT GEAR POSITION IN MEMORY
YES
MAKE GEAR POSITION VALID
S6
END

START
THROTTLE OPENING BELOW PREDETERMINED VALUE ?
L1
NO
YES
TIMER EQUAL TO 0 ?
L7
NO
YES
VEHICLE SPEED EQUAL TO OR LESS THAN 5 km/h ?
L2
YES
NO
SUBTRACT TIMER
L9
CLUTCH DISENGAGED MORE THAN HALF CLUTCH?
L3
YES
NO
RELEASE UPSHIFT PROHIBIT CONDITION
L8
TRANSMISSION IN LOW-SPEED GEAR ?
L4
NO
YES
ESTABLISH UPSHIFT PROHIBIT CONDITION
L5
SET TIMER
L6
END

ENGINE
TRANS-MISSION
MAIN CON-TROL UNIT
ACCELERATER
BRAKE
KEY SWITCH
EXHAUST BRAKE SWITCH
MAIN
STARTER
EXHAUST BRAKE
GEAR
D/U
D/U
F
M
W
rt
R 2 4 N 1 3 5
1 1a 2 2a 2b 2c 2d 2e 2f 2g 3 3a 3b 3c 4 6 7 7a 7b 7c 8 9 10 11 12 13 14 15 16 17 17a 22 23 24 30 30a 30b 30c

AUTOMATIC TRANSMISSION WITH UPSHIFT PROHIBIT DEPENDENT ON THROTTLE AND VEHICLE SPEED

CROSS-REFERENCE TO RELATED APPLICATIONS

This is a continuation of application Ser. No. 730,992 filed Jul. 16, 1991 now abandoned.

BACKGROUND OF THE INVENTION

1. Field of the Invention

The present invention relates to automatic transmissions for controlling the transmission based on the vehicle speed and the throttle opening.

2. Description of the Prior Art

FIG. 4 shows a conventional automatic transmission. A well known parallel axis gear type transmission 1 is controlled by a transmission actuator 2 which consists of a select actuator 2*a* and a shift actuator 2*b*. Both of the actuators 2*a* and 2*b* are driven by a hydraulic drive system 3 which consists of a tank 3*a*, a pump 3*b*, an accumulator 3*c*, and a hydraulic pressure switching electromagnetic valve (not shown) to control the drive gear of the transmission 1 via a pair of piston rods 2*c* and 2*d*. The actuator 2 is controlled by a drive unit (D/U) 2*e*, which in turn is controlled by a main control unit 4. Feedback control is made such that the actual position signals of a pair of potentiometers 2*f* and 2*g* agree with the target position signals M fed from the main control unit 4. Consequently, as shown in FIG. 5, the gear position is shifted from the neutral position 5*g* to the first gear 5*a*, second gear 5*b*, third gear 5*c*, fourth gear 5*d*, fifth gear 5*e*, or reverse driving 5*f*. A clutch 6 is linked to the piston rod 7*a* of a clutch actuator 7 for engagement and disengagement. The hydraulic drive system 3 drives the clutch actuator 7. The actual position of the piston rod 7*a* is detected by the potentiometer 7*c*, and the actual position signal is fed back to a drive unit 7*b*. The drive unit 7*b* is controlled by the main control unit 4 such that the actual position signal agrees with the target position signal F fed by the main control unit 4.

An engine 8 has a control unit 9 which is controlled by the main control unit 4. The rotation of the engine 8 is transmitted to an axle 10 via the clutch 6 and the transmission 1. Respective signals of an accelerator opening detector 11, a brake pedal detector 12, a key switch 13, an exhaust brake switch 14, and a selector 15 and the rpm output signal W of a vehicle speed detector 22 are fed to the main control unit 4 to control the drive units 2*e* and 7*b* and the engine control unit 9, a display panel 16, and a control unit 17*a* for controlling a gear position display panel 17. The rpm output signal W from the vehicle speed detector 22 is multiplied in the main control unit 4 by a constant which consists of the radius r of car wheels 23 and the gear ratio of a differential gear 24 to provide a vehicle speed V, which is displayed on an instrument panel (not shown) along with the engine rpm and the fuel reserve. Thus, the main control unit 4 controls the clutch 6 and the transmission 1 based on the throttle opening S or accelerator pedal depression, the vehicle speed V, and the position of the selector 15. The gear position is shifted from the neutral 5*g* to one of the shift positions 5*a*–5*f* as shown in FIG. 5.

As Japanese Patent Application Kokai No. 59-1855 discloses, the main control unit 4 includes an automatic shift unit 30 for effecting automatic shifting according to input signals such as the vehicle speed and the throttle opening. The automatic shift unit 30 includes the first and second gear shift maps 30*a* and 30*b* having a gear shift characteristic N which is determined by the vehicle speed V (rpm W×constant) and the throttle opening S (accelerator pedal depression) as shown in FIG. 6, a computer unit 30 *c* for computing the gear position of the transmission 1 based on the gear shift characteristic N of the first or second gear shift maps 30*a* or 30*b*, and a gear selector 30*d* for controlling the actuator 2 based on the gear position from the computer unit 30*c* to make upshift or downshift. When the selector 15 is set in the automatic shift position "4", the automatic shift unit 30 controls the transmission 1 between the first and fourth gears based on the first gear shift map 30*a* while when the selector 15 is set in the automatic shift position "5" it controls the transmission 1 between the second and fifth gears based on the second gear shift map 30*b*.

For example, when the accelerator pedal is released to reduce the vehicle speed, with the transmission 1 in the second gear (point A of the gear shift map 30*a*), the automatic shift unit 30 upshifts the transmission 1 to the third gear despite the fact that the vehicle speed is reduced, thus failing to provide satisfactory engine braking.

Japanese Patent Application Kokai No. 58-211061 discloses an automatic transmission which is able to detect the rate of accelerator pedal depression and, if the rate is above a certain value, prohibit any shift. Thus, if the rate of accelerator pedal change is above the certain value, no upshift from A to B is made so that the transmission 1 remains in the second gear, thereby providing satisfactory engine braking.

In the conventional automatic transmission, when the driver tries to apply engine braking by releasing the accelerator pedal at the certain rate, the transmission can be upshifted because the perception of the certain rate varies with the individual driver. In addition, to detect the certain rate, it is necessary to provide a differential circuit for differentiating changes of the accelerator pedal. This differential circuit is so sensitive to noise that it suffers from frequent malfunctions.

When the accelerator pedal is released abruptly after the vehicle starts to move with low speed gear and half clutch, the clutch is kept disengaged to prevent engine stop when the vehicle stops while the automatic transmission is put into the upshift prohibit condition. As a result, when the vehicle starts to descend downhill, for example, no upshift is made while the clutch is kept disengaged even when the vehicle speed is increased, thus presenting very dangerous running conditions. When the accelerator pedal is depressed under the upshift prohibit condition, the upshift prohibit condition is released instantly, failing to provide satisfactory acceleration despite the fact that the accelerator pedal is depressed for acceleration.

SUMMARY OF THE INVENTION

Accordingly, it is an object of the invention to provide an automatic transmission which is able to provide satisfactory acceleration or deceleration while preventing the vehicle from running under dangerous conditions.

It is another object of the invention to provide an automatic transmission which is able to accommodate different drivers and driving conditions.

According to one aspect of the invention there is provided an automatic transmission which includes a clutch; a clutch actuator for detecting and controlling a position of the clutch; a transmission; a transmission actuator for driving the transmission; a vehicle speed detector for detecting a vehicle speed; a throttle opening detector for detecting a throttle opening; an automatic shift unit including a gear shift map having a gear shift characteristic which is determined based on the vehicle speed and the throttle opening; a computer unit for computing a target gear position of the transmission based on the vehicle speed and the throttle opening according to the gear shift map; a gear position selector for controlling the transmission actuator based on the target gear position to upshift or downshift the transmission; a shift prohibit unit for determining whether the target gear position matches a previous gear position for a predetermined number of times in a predetermined period of time and, if they do not match for the predetermined number of times, invalidating the target gear position and prohibiting any shift operation according to the gear shift map; and a shift determination unit for establishing a upshift prohibit condition when the throttle opening is equal to or less than a predetermined opening while releasing the upshift prohibit condition when the vehicle speed is low or the clutch is in a position toward disengagement from a half clutch position, or with the transmission is set in a low-speed gears even if the throttle opening is equal to or less than the predetermined value.

According to another aspect of the invention, the shift determination unit keeps the upshift prohibit condition for a predetermined time even if an accelerator pedal is depressed and the throttle opening becomes larger than the predetermined opening.

The above and other object, features, and advantages of the invention will be more apparent from the following description when taken in conjunction with the accompanying drawings.

DESCRIPTION OF THE PREFERRED EMBODIMENT

Figure 1:
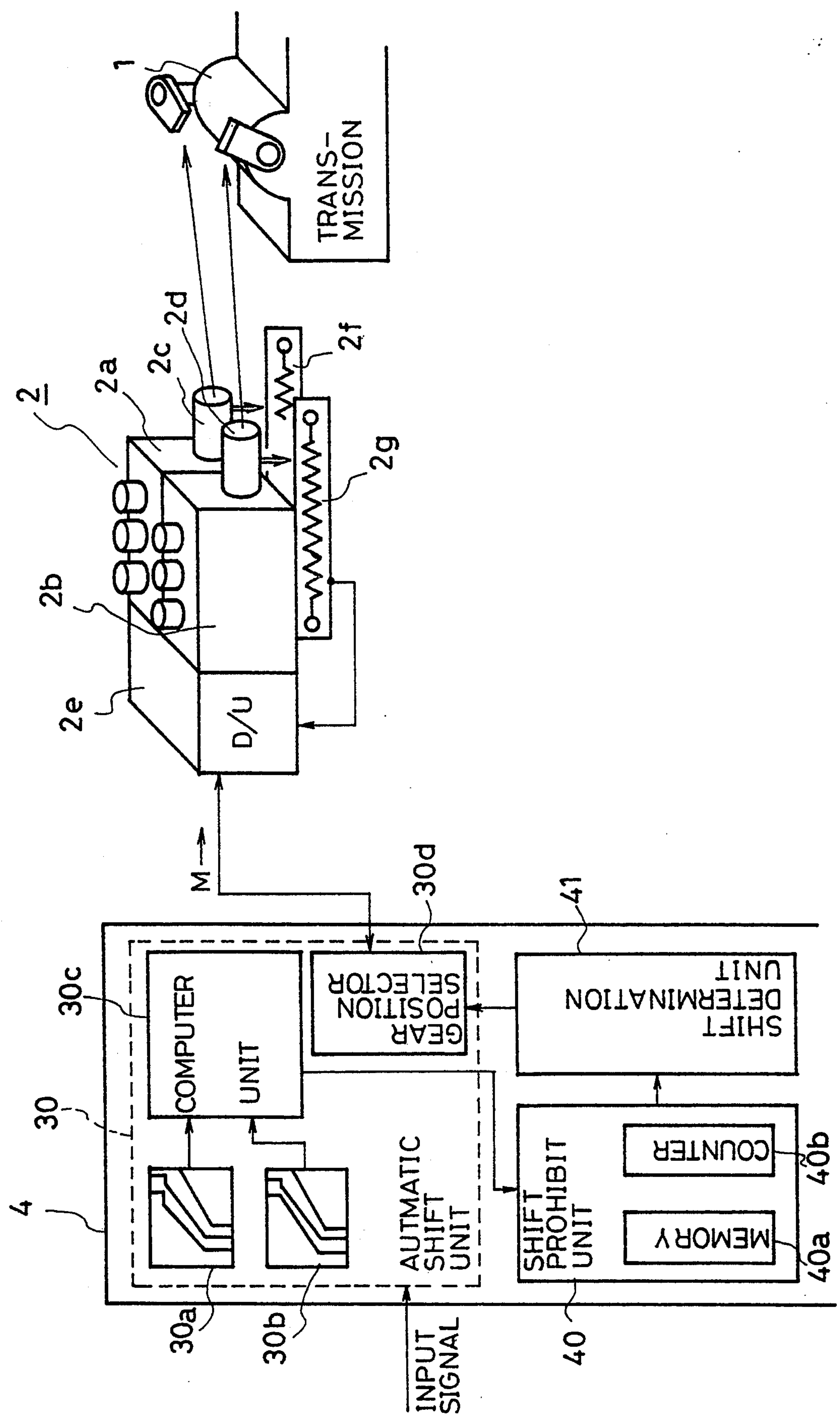
FIG. 1 is a schematic diagram of an automatic transmission according to an embodiment of the invention.
Figure 4:
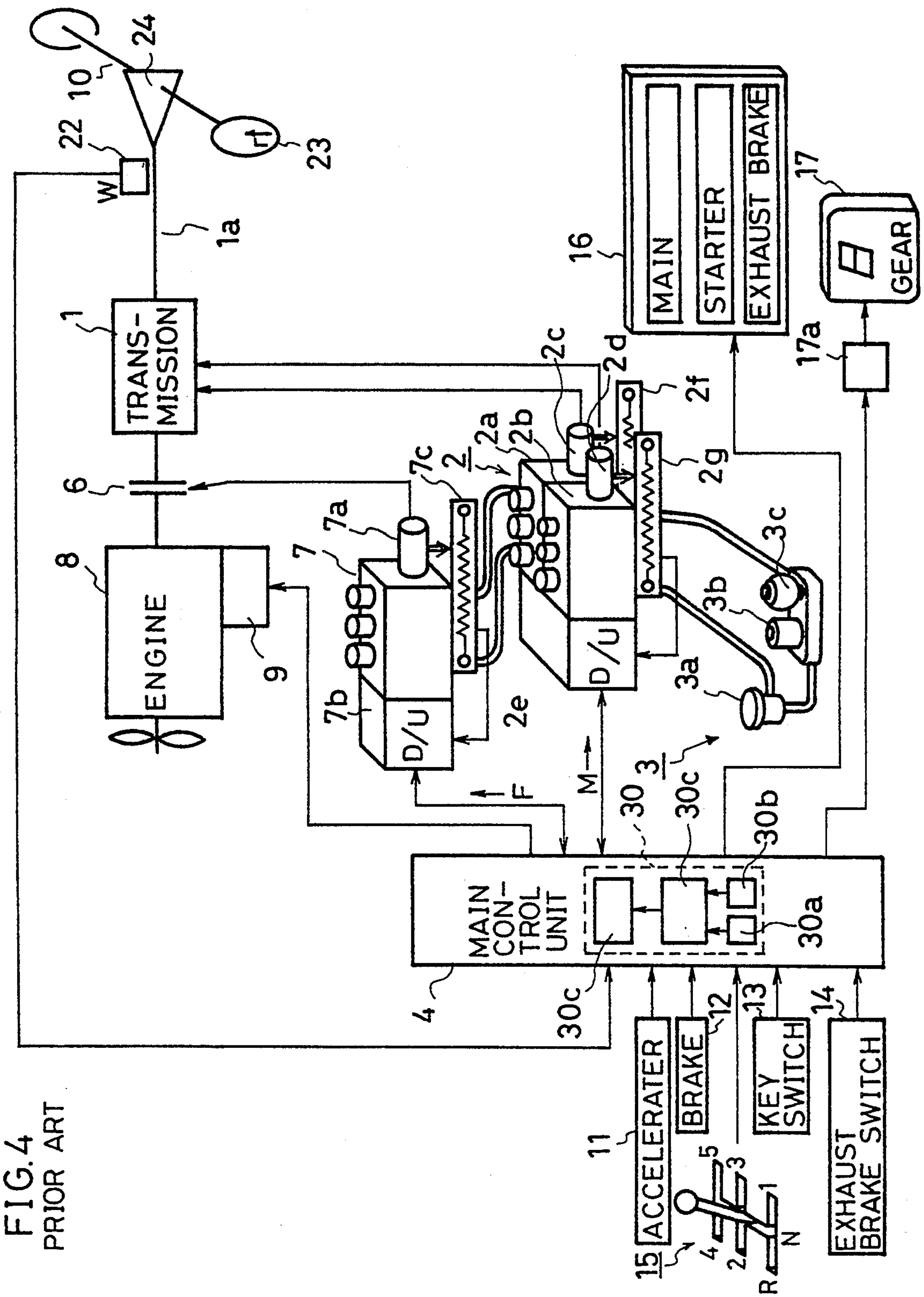
FIG. 4 is a schematic diagram of a conventional automatic transmission.
Figure 5:
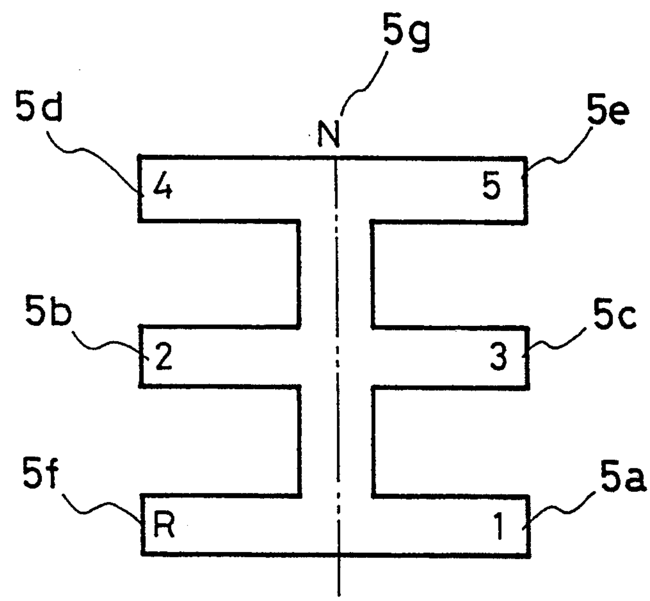
FIG. 5 is a top plan view of a gear shift pattern for the conventional automatic transmission.
Figure 6:
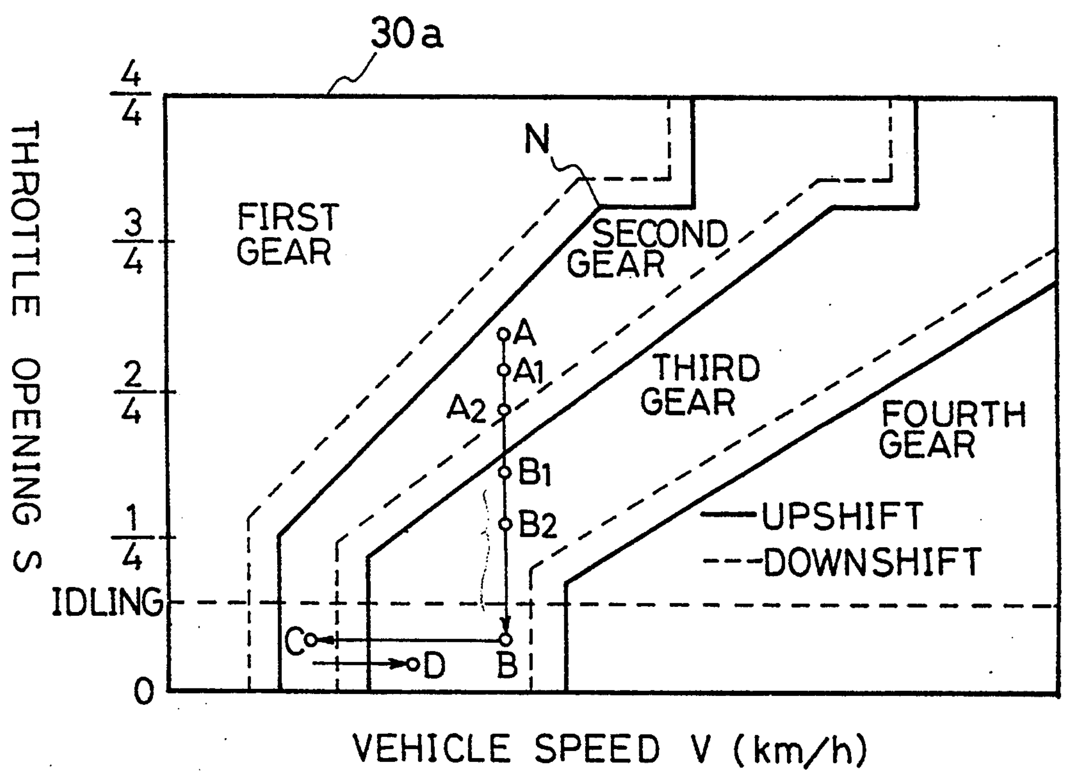
FIG. 6 is a graph showing a gear shift map.

In FIG. 1, like reference characters denote like or corresponding parts in FIGS. 4 and 6, and their description will be omitted. A shift prohibit unit 40 includes a memory 40*a* for storing computation results of the computer unit 30*c* according to the gear shift maps 30*a* and 30*b* and a counter 40*b* for counting the gear determination results. The shift prohibit unit 40 compares the target gear position fed from the computer unit 30*c* with the previous gear position stored in the memory 40*a*. If they agree, the counter 40*b* count it and determines whether the count is equal to a predetermined value or 4, for example, within a predetermined period of time. If the count is less than 4, the target gear position is invalidated, and any shift according to the gear shift maps 30*a* and 30*b* is prohibited. A shift determination unit 41, which establishes an upshift prohibit condition when the throttle opening S is below a predetermined opening or during idling, releases the upshift prohibit condition when the vehicle speed is lower than a predetermined speed, the clutch 6 is in a position toward disengagement more than the half clutch, or the transmission is set at the low speed first or second gear. However, it keeps the upshift prohibit condition for a predetermined period of time after the accelerator pedal is depressed (throttle opening S becomes above the predetermined opening).

In operation, the computer unit 30*c* computes gear positions by reading changes in the throttle opening S at a predetermined frequency and computes gear positions based on the throttle openings S and the vehicle speed V as shown in FIG. 6. This gear positions are determined according to the gear shift characteristic N; the second gear from A to $A_2$ and the third gear from $B_1$ to B.

Figure 2:
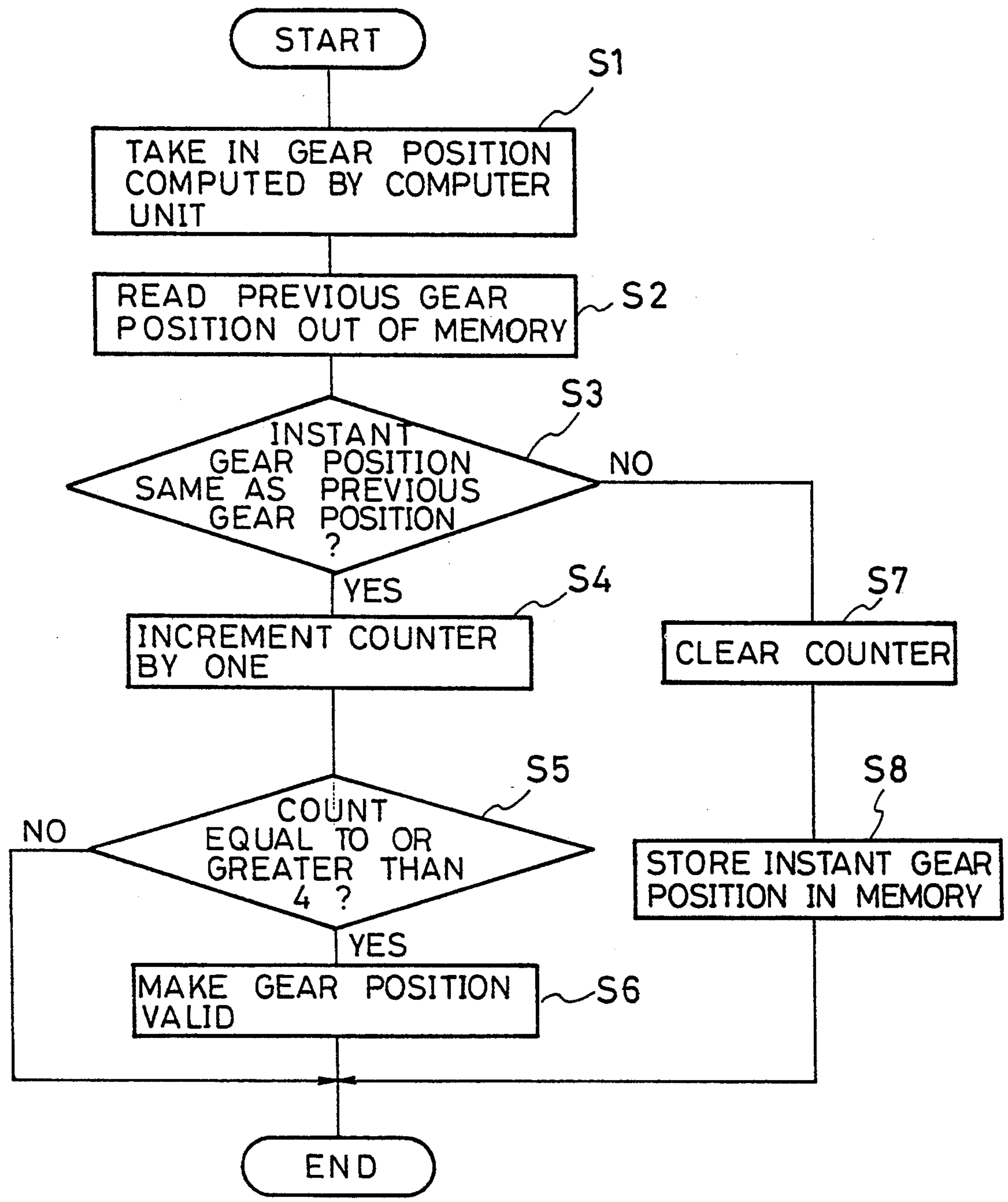
FIGS. 2 and 3 are flowcharts showing the operation of the automatic transmission.

The shift prohibit unit 40 is controlled according to the flowchart of FIG. 2. In step S1, the instant or target gear position computed by the computer unit 30*c* is fed to the shift prohibit unit 40. In step S2, the previous gear position is read out of the memory 40*a*. In step S3, the target gear position is compared with the previous gear position to determine whether they are the same. In step S4, the counter 40*b* is incremented by one because the gear position of $A_1$ is the same as that of A. In step S5, whether the count is equal to or greater than 4 is determined. In step S6, if the count is 4, the present target gear position is made valid. In step S7, however, since the target gear position of $B_1$ is different from the previous gear position of $A_2$, the counter 40*b* is cleared. In step S8, the target gear position is stored in the memory 40*a*. The subsequent target gear positions are compared in the same way. Even if the throttle opening S changes to B as shown in FIG. 6, the count of the counter 40*b* is 3 from $B_1$ to B so that the target gear position is not made valid for shifting. In other words, even if the accelerator pedal is released for deceleration, no upshift is made, thereby providing satisfactory engine braking.

Figure 3:
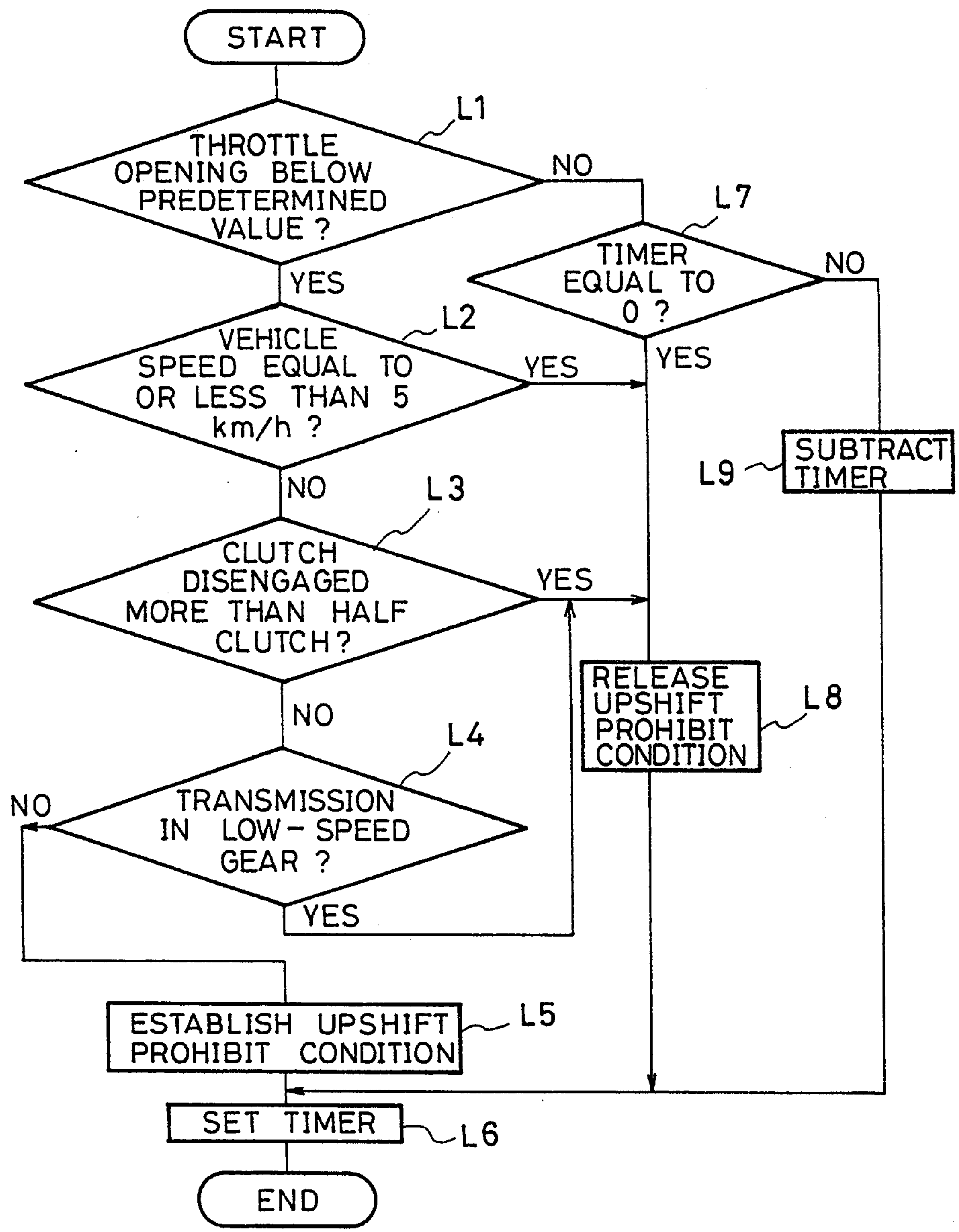

In FIG. 3, if the gear position is made valid by the shift prohibit unit 40, whether the throttle opening S is no more than a predetermined openings value (idling position) is determined in step L1. If it is below the predetermined value, whether the vehicle speed V is low (5 km/h) is determined based on the vehicle speed V, the position of the clutch 6, and the gear position in step L2. If it is higher than 5 km/h, whether the clutch 6 is in a position toward disengagement more than the half clutch is determined in step L3. If it is not, whether the gear is at a low-speed position such as the first or second gear is determined in step L4. If the throttle opening S is below the predetermined openings even when the gear is determined at a high-speed position, acceleration is not desired so that upshift is prohibited in step L5. In step L6, the timer is set for keeping the upshift prohibit condition. On downhill grades, it is dangerous to drive with low speed gears, with the clutch 6 disengaged so that the upshift prohibit condition is released in step L8.

For example, when the vehicle is decelerated with the accelerator pedal released as shown in FIG. 6, the gear position moves from B to C. At this point, the count of the counter 40*b* is 4, thus making the gear position at C valid. Thus, it is possible to shift the transmission from the third gear to the second gear. When the vehicle speed is increased on a downhill grade, bringing the gear position to D which is in the idling range of the throttle opening S, it is possible to upshift from the second gear to the third gear because of low speed positions. When the throttle opening S is not in the idling range, or under ordinary running conditions, whether a predetermined time has passed since the upshift prohibit condition is established is determined in step L7. If the predetermined time has passed, the upshift prohibit condition is released in step L8. Even if non-deceleration conditions are determined in steps L2–L4, the upshift prohibit condition is released. Unless the predetermined time has passed in the timer, the upshift prohibit condition is held so that the timer is subtracted in step L9. In other words, even if the accelerator pedal is depressed at B, no instant upshift is made.

That is to say, as shown in FIG. 6, when the gear position changes from A to B and to C, the shift prohibit unit 40 and the shift determination unit 41 determine whether the target gear position computed by the computer unit 30*c* matches the previous gear position for a predetermined number of times within a predetermined period of time. Unless it does not match the previous gear position for the predetermined number of times, the instant gear position is invalidated to prohibit any shift according to the gear shift maps 30*a* and 30*b* while when the throttle opening S is below a predetermined openings, the upshift prohibit condition is established, thereby providing satisfactory acceleration or deceleration. In addition, the gear shift is made regardless of the rate of changes in the accelerator pedal thus accommodating different drivers' reactions. Moreover, no differential circuit is required so that the automatic transmission is resistant to noise, thus suffering from few malfunctions.

When the vehicle speed is low or the clutch is in a position toward disengagement from the half clutch position, or the transmission is set in low-speed gears, the shift determination unit 41 releases the upshift prohibit condition so that it is possible to prevent the vehicle from running under dangerous conditions. In addition, even if the accelerator pedal is depressed, the upshift prohibit condition is held for the predetermined time, thereby providing satisfactory acceleration.

As has been described above, with the shift prohibit unit according to the invention, when to shift is determined regardless of the rate of changes in the accelerator pedal so that the drivers can drive the vehicles depending on their own feelings. In addition, no differential circuit is required so that the automatic transmission is resistant to noise, suffering few malfunctions. The shift determination unit establishes a upshift prohibit condition when the throttle opening S is below the predetermined opening. However, if the vehicle speed is low or the clutch is in a position toward disengagement from the half clutch position, or the transmission is set in with low-speed gears when the throttle opening S is below the predetermined opening, it releases the upshift prohibit condition, thereby preventing the vehicle from running under dangerous conditions. In addition, even if the accelerator pedal is depressed, it keeps the upshift prohibit condition for a predetermined time, thereby assuring satisfactory acceleration.

We claim:

1. An automatic transmission comprising:
a clutch;
a clutch actuator for detecting and controlling a position of said clutch;
a transmission;
a transmission actuator for driving said transmission;
a vehicle speed detector for detecting a vehicle speed;
a throttle opening detector for detecting a throttle opening;
an automatic shift unit including a gear shift map having a gear shift characteristic which is determined based on said vehicle speed and said throttle opening;
a computer unit for computing a target gear position of said transmission based on said vehicle speed and said throttle opening according to said gear shift map;
a gear position selector for controlling said transmission actuator based on said computed target gear position to upshift or downshift said transmission;
a shift prohibit unit for determining whether said computed target gear position matches a previous gear position for a predetermined number of times and, if said computed target gear position matches said previous gear position, making said computed target gear position valid for shifting but, if said computed target gear position and said previous gear position do not match for said predetermined number of times, clearing a counter so that said computed target gear position is not made valid for shifting to thereby prohibit any shift operation according to said gear shift map; and
a shift determination unit for establishing an upshift prohibits condition when said throttle opening is less than a predetermined opening and the transmission is not set in one of a first and a second gear position but releasing said upshift prohibit condition when said vehicle speed is lower than a predetermined speed and when said vehicle speed is not lower than a predetermined speed and said clutch is in a position toward disengagement from a half clutch position or said transmission is set in one of a first and a second gear position even if said throttle opening is less than said predetermined opening.

2. An automatic transmission comprising:
a clutch;
a clutch actuator for detecting and controlling a position of said clutch;
a transmission;
a transmission actuator for driving said transmission;
a vehicle speed detector for detecting a vehicle speed;
a throttle opening detector for detecting a throttle opening;
an automatic shift unit including a gear shift map having a gear shift characteristic which is determined based on said vehicle speed and said throttle opening;
a computer unit for computing a target gear position of said transmission based on said vehicle speed and said throttle opening according to said gear shift map;
a gear position selector for controlling said transmission actuator based on said computed target gear position to upshift or downshift said transmission;
a shift prohibit unit for determining whether said computed target gear position matches a previous gear position for a predetermined number of times and, if said computed target gear position and said previous gear position do not match for said predetermined number of times, clearing a counter so that said computed target gear position is not made valid for shifting to thereby prohibit any shift operation according to said gear shift map; and
a shift determination unit for establishing an upshift prohibit condition when throttle opening is less than a predetermined opening and the transmission is not set in one of a first and a second gear position but releasing said upshift prohibit condition (a) when said vehicle speed is lower than or equal to a predetermined speed, (b) when said vehicle speed is not lower than a predetermined speed and said clutch is in a position toward disengagement from a half clutch position, or (c) when said vehicle speed is not lower than a predetermined speed, said clutch is not in a position toward disengagement from a half clutch position, and said transmission is set in a first or second gear position even if said throttle opening is equal to or less than said predetermined opening,except for a predetermined period of time after said throttle opening is above said predetermined opening.

3. The automatic transmission of claim 1 or 2, wherein said shift prohibit unit comprises:

a memory for storing said gear position computed by said computer unit; and a counter for counting a frequency of matches between said instant gear position and said previous gear position from said memory.

4. The automatic transmission of claim 1 or 2, wherein said automatic shift unit includes a plurality of gear shift maps for storing different gear shift characteristics based on set gear positions.

5. The automatic transmission of claim 1, wherein said predetermined opening is set at an idling opening.

6. The automatic transmission of claim 1, wherein said predetermined speed is approximately 5 km/h.

7. The automatic transmission of claim 2, wherein said predetermined opening is set at an idling opening.

* * * * *